July 3, 1962   J. R. FOSTER   3,042,090
ROTATABLE WHEEL SUPPORT FOR TIRE HANDLING MACHINES
Filed May 27, 1960   3 Sheets-Sheet 1
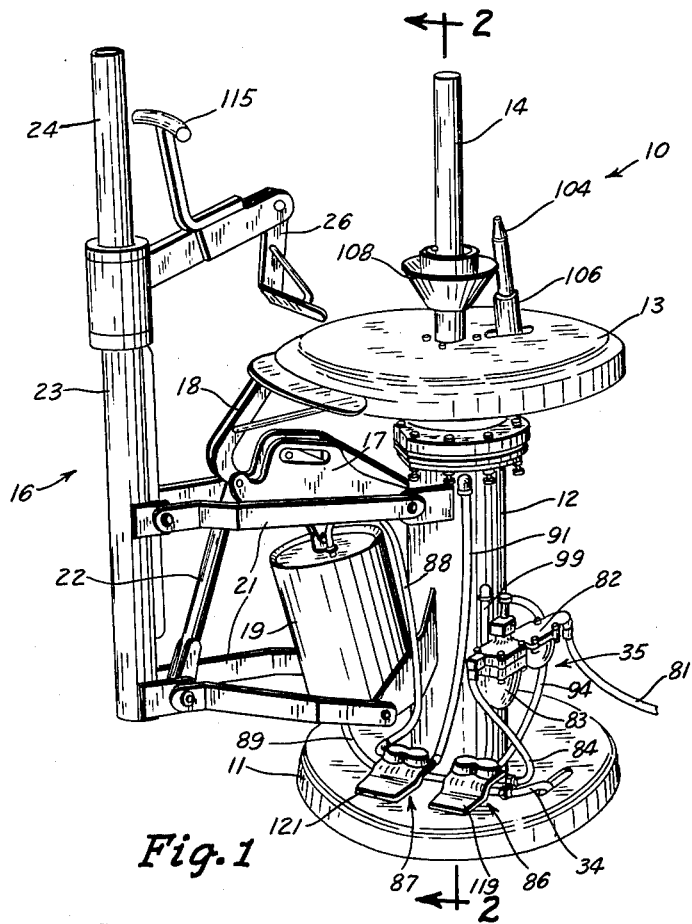
Fig. 1
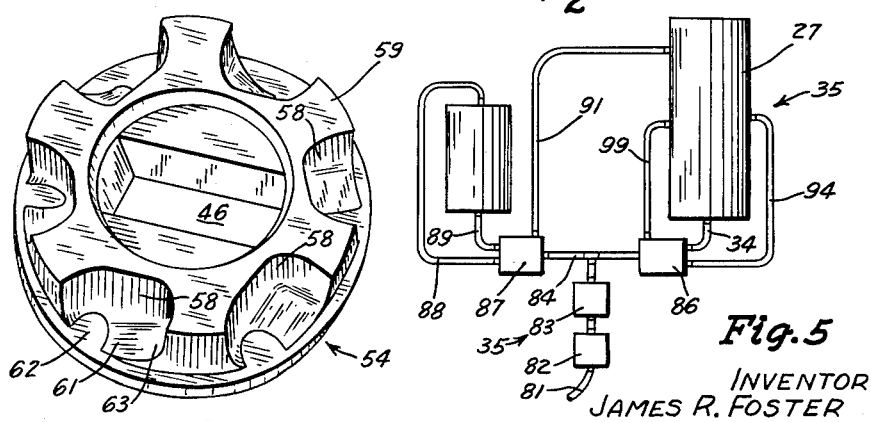
Fig. 4
Fig. 5
INVENTOR
JAMES R. FOSTER
BY
Lowell & Henderson
ATTORNEYS

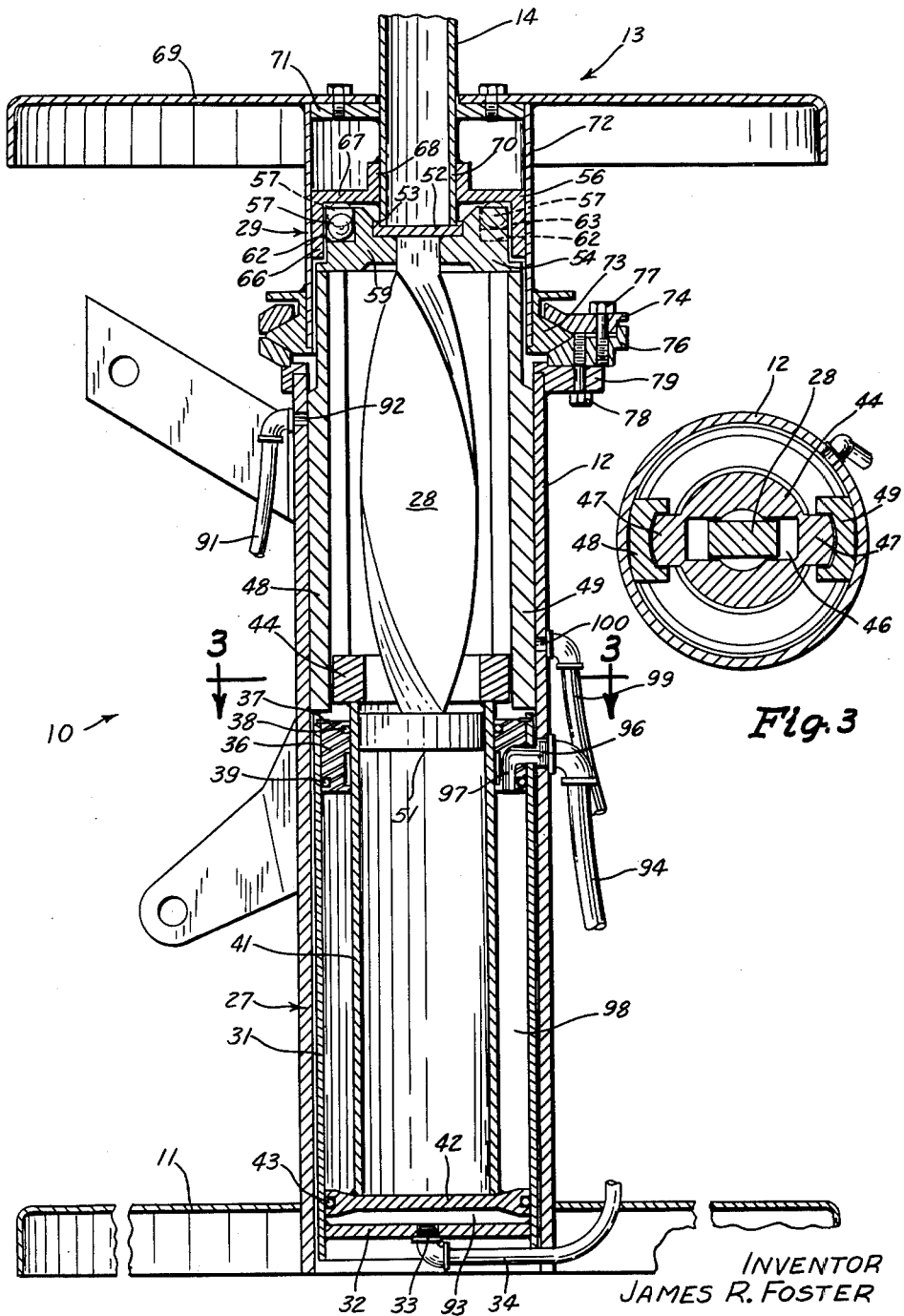

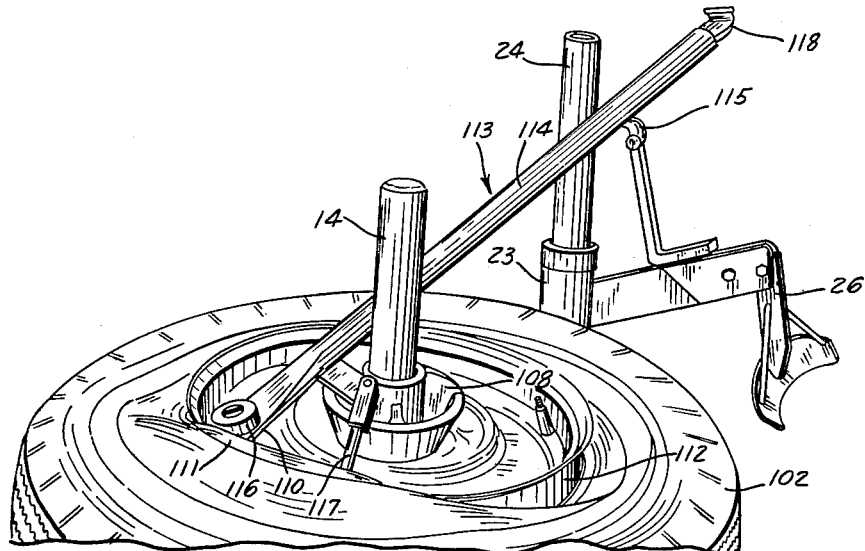
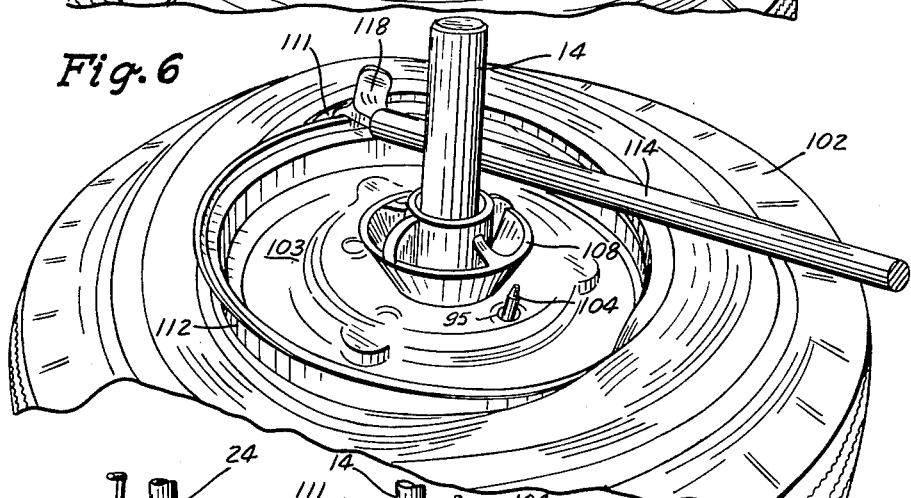
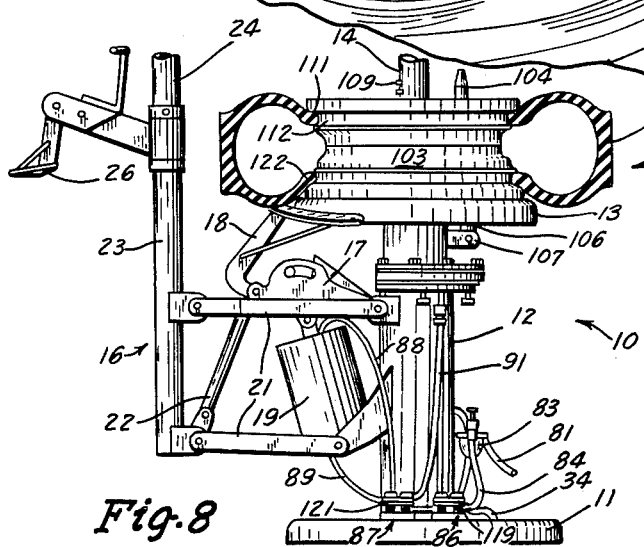

United States Patent Office 3,042,090
Patented July 3, 1962

3,042,090
ROTATABLE WHEEL SUPPORT FOR TIRE HANDLING MACHINES
James R. Foster, Fort Dodge, Iowa, assignor to The Coats Company, Inc., Fort Dodge, Iowa, a corporation of Iowa
Filed May 27, 1960, Ser. No. 32,289
4 Claims. (Cl. 144—288)

This invention relates generally to tire handling equipment and in particular to a machine for breaking the beads of a pneumatic tire from the complementary flange of a wheel rim on which the tire is assembled or mounted.

An object of this invention is to provide an improved machine for breaking tire beads from an associated wheel rim flange.

A further object of this invention is to provide a tire bead breaking machine having a horizontal table for supporting a tire and wheel assembly, which table is mechanically rotatable in controlled increments of rotation by the operator.

Another object of this invention is to provide a tire bead breaking machine including an upright tubular standard on which a table is rotatably mounted for supporting a tire and wheel assembly, wherein an operator actuated pneumatic power means is provided within the standard for rotating the table.

Yet another object of this invention is to provide a tire bead breaking machine having an upright tubular standard on which a tire and wheel supporting table is rotatably mounted, wherein a pneumatic means is mounted within said standard for rotating the table, and wherein means are provided for supporting a tire mounting and demounting tool in locked operative engagement with the tire bead and the wheel flange during rotation of the table.

Another object of this invention is to provide a tire bead breaking machine having a standard, and a tire and wheel supporting table rotatably mounted thereon, a pneumatically powered upper and lower bead breaking mechanism mounted on the standard, and a pneumatic power means mounted within the standard for rotating the table relative to the bead breaking mechanism.

A further object of this invention is to provide structure for attaining the above designated objectives which is economic to manufacture, simplified in arrangement, and effective in operation.

These objects, and other features and advantages of this invention will be readily apparent from the following description when taken in conjunction with the accompanying drawings, wherein:

FIG. 1 is a perspective view of a tire bead breaking machine embodying the features of this invention;

FIG. 2 is an enlarged vertical sectional view taken along the line 2—2 of FIG. 1;

FIG. 3 is a horizontal sectional view taken along the line 3—3 in FIG. 2;

FIG. 4 is an enlarged perspective view of a component of a clutch bearing unit embodied in the machine;

FIG. 5 is a schematic view of the pneumatic system for operating the machine;

FIGS. 6 and 7 are enlarged fragmentary perspective views showing the dual utilization of a tire mounting and demounting tool in combination with the machine, on which is mounted a tire and wheel assembly; and FIG. 8 is a reduced side elevational view of the machine of FIG. 1, with a tire and wheel assembly mounted thereon.

With reference to the drawings, the tire bead breaking machine of this invention, indicated generally at 10 is illustrated in FIG. 1 as including a flat circular base 11, on which a central tubular standard 12 is secured. At the upper end of the standard 12, a horizontal wheel supporting table unit 13 is rotatably mounted in concentric relation with the standard 12. The table unit 13 is of a size to receive conventional vehicular wheels for twelve through sixteen inch tires. Coaxially arranged and projected upward from the standard 12 is a shaft 14 which acts as a center post for the table unit 13.

Securely mounted on one side of the standard is a dual action bead breaking assembly 16 which includes generally an actuating unit 17, a lower bead breaking unit 18, a double acting pneumatically powered cylinder unit 19, a parallel link unit 21, a connecting link 22, an upright support 23 having an upstanding shaft 24 at its upper end, and an upper bead breaking unit 26. Other than the upstanding shaft, the bead breaking assembly 16 is described in detail in my co-pending application entitled "Tire Bead Breaking Apparatus," filed September 23, 1959, Serial No. 841,809, which matured into Patent No. 3,008,512, issued November 14, 1961.

Mounted within the standard 12 at the lower portion thereof is a pneumatically powered piston and cylinder unit 27 (FIG. 2) operatively connected to a spiral member 28 for rotating the table unit 13 through a clutch bearing unit 29. The piston and cylinder unit 27 comprises a cylinder 31 suitably supported within the standard 12 and closed at its lower end by a plate member 32 having an opening 33 formed therein. Air under pressure is directed through the opening 33 from a conduit 34 which is connected to a fluid pressure regulating assembly 35 (FIG. 1) that is operated by the operator of the machine.

A sealing ring or sleeve 36 (FIG. 2) is secured at the upper end of the cylinder 31 by a snap ring 37. A fluid tight seal is maintained between the cylinder 31 and the piston 41 by means of O-rings 38 and 39. The piston 41 is elongated and tubular and has a circular plate 42 secured at its lower end for bearing engagement with the cylinder 31, the engagement being fluid tight by the provision of an O-ring 43 on the plate 42. Mounted at the upper end of the piston 41 is a slider nut 44 (FIGS. 2 and 3) formed with a substantially rectangular central opening 46, and a pair of diametrically opposed projections 47. Upon movement of the piston 41 axially of the standard 12, the axial movement of the slider nut 44 is guided and locked against rotational movement by virtue of the projections 47 being nested in a pair of diametrically opposed, elongated ways or guides 48 and 49 (FIGS. 2 and 3) secured to the inside of the standard 12.

The spiral member 28, formed with a one-half twist is extended through the nut opening 46 and has a circular element 51 at its lower end mounted within the piston 41 so as to be rotatable during reciprocable movement of the piston 41. At the upper end of the spiral member 28 is secured a circular base 52 provided with a peripheral upstanding flange 53 that constitutes a bearing-type seat for the lower end 70 of the center post 14. The base 52 is secured to an annular lower race 54 (FIGS. 2 and 4) of the clutch bearing unit 29.

The lower race 54 includes a series of arcuately spaced pockets 58 formed in the body 59 thereof. Each pocket 58, in which is carried a ball bearing 57, is provided with a floor 61 (FIG. 4), that is inclined upwardly from its lower end 62 toward its upper end 63 for a purpose described hereinafter. An annular upper race 56 (FIG. 2) of the clutch bearing unit 29 includes an outer wall 66 depending adjacent the ball bearings 57, and a top wall 67 above the ball bearings 57 in which a walled opening 68 is formed for receiving the lower end 70 of the center post 14 to which the race 56 is secured as by welding.

The table unit 13 (FIG. 2), to which the wall 66 of the upper race 56 is secured, includes a circular, horizontally disposed table 69 bolted to an annular member 71 centrally thereof, with both the table 69 and the member 71 having axially aligned openings through which the end 70 of the center post extends. The member 71 is welded to the center post 14. The table 69 is welded to a tubular sleeve 72 depending from the table 69 and which has an outer diameter approximately the equal to the internal diameter of the standard 12. The sleeve 72 extends upwardly from and in axial alignment with the standard 12 and acts as a rotatable extension thereof. The lower end of the sleeve 72 is rotatably mounted on the standard 12 by means of an annular seating ring 73 disposed for rotation between a pair of upper and lower bearing rings 74 and 76, respectively, held together by bolts 77. The lower bearing ring 76 is secured by bolts 78 to a lower annular ring 79 mounted on the standard 12, and with the bolts 78 providing means for adjusting the spacing between the bearing rings 74 and 76 to properly accommodate the seating ring 73 therebetween.

For operating the machine 10, air is supplied under pressure from a conventional source through a conduit 81 (FIGS. 1 and 5) to an air filter 82 mounted on the standard 12. From the air filter 82, the pressurized air is directed through a commercially available oiler 83 which functions to entrain a lubricant into the air. From the oiler 83, the air is directed through a conduit 84 to an air valve 86 for the piston and cylinder unit 27, and to another air valve 87 for the piston and cylinder power unit 19 of the bead breaking assembly 16. From the air valve 87, the air is selectively supplied either above or below the piston (not shown) of the power unit 19 by conduits 88 and 89, respectively, and with the fluid being exhausted therefrom through a conduit 91 to an opening 92 (FIG. 2) formed in the upper end of the standard 12. The opening 92 directs the exhaust air into the interior of the upper portion of the standard 12 to lubricate particularly the guides 48 and 49 and the nut 44.

From the air valve 86 (FIGS. 1 and 5), the pressurized air is directed through the conduit 34 (FIG. 2) to an expansible chamber 93 formed within the cylinder 31 between the stationary member 32 and the movable plate 42. Another conduit 94 directs the pressurized air from the air valve 86 through an opening 96 (FIG. 2) formed in the standard 12 and which is in communication with a passage 97 formed in the sleeve 36. By this arrangement, the pressurized air is directed into an expansible chamber 98 formed on the side of the plate 42 opposite the chamber 93, and between the plate 42 and the sleeve 36. The pressurized air is exhausted from the air valve 86 through a conduit 99 which is in communication with the interior of the standard 12 by means of an opening 100 formed in the side of the standard.

In the use of the machine 10, a tire and wheel assembly 101 (FIG. 8), consisting of a tire 102 mounted on a wheel 103, is arranged in a flat, horizontally supported position on the table unit 13, with the center post 14 extended upwardly through a central opening (not shown) in the wheel 103. With the assembly 101 in this horizontal position, a dowel unit 106 (FIGS. 1 and 8), pivotally secured to ears 107 carried on the standard 12 at a position below the table unit 13, is extended through one of the bolt receiving apertures 95 (FIG. 7) in the wheel 103 to hold the wheel against rotation on the table unit 13.

The wheel 103 is centered relative to the center post 14 and in turn relative to the table unit 13 by the provision of a cone shaped member 108 (FIG. 1) having a tubular hub threadably engageable with a threaded rack 109 (FIG. 8) secured to and extended axially of the center post 14 at a positin above the table unit 13. The cone shaped member 108 (FIG. 6) is rotated downwardly on the center post 14 to an engaged position with the sidewall of the center opening in the wheel 103, whereby to tightly clamp the wheel against the table unit 13.

Referring to FIG. 8, as described more fully in my copending application referred to hereinbefore, the dual action bead breaking assembly 16 is operable upon a depressing of the foot treadle 121 for the air valve 87 to first break away the lower bead 122 by operation of the actuating unit 17 relative to the lower bead breaking unit 18. Secondly, upon a proper locating of the upper bead breaking unit 26 and a release of the treadle 121, by operation of the actuating unit 17 through the connecting link 22 and the parallel linkage unit 21, the upper bead 111 is broken by the upper bead breaking unit 26. After either of these operations, should it be desirable to rotate the table unit 13 a certain arcuate increment of the full rotation, the operator can do so by manipulating the foot treadle 119 for the air valve 86 according to the following description.

As a result of operation of the air valve 87 for the dual-action bead breaking assembly 16, the direction of air under pressure through either conduit 88 or 89 results in the exhaust air, in which lubricant is entrained, being transmitted through the exhaust conduit 91 (FIG. 2) to the interior of the standard 12.

Assuming the upper and lower beads, 111 and 122 respectively, have broken from the wheel flanges, and it is desirable to remove the upper bead 111 (FIG. 8) from its complementary wheel rim or flange 112, an elongated dual-purpose tire handling tool 113 (FIG. 6) is utilized. The tool 113 comprises a shank 114 provided at one end with a bead breaking or tire demounting unit which includes a roller 116 and a pivotally mounted finger 117. The other end of the shank 114 has a shoe 118 for guiding the bead 111 back into a position for mating engagement with the flange 112. Thus, to remove the bear 111 from the flange 112, the demounting end 110 of the tool 113 is inserted between the flange 112 and the bead 111, and with the shank 114 supporting in an inclined manner between the center post 14 and the upstanding shaft 24 in a position best illustrated in FIG. 6. Initially and before the machine 10 is operated, the tool 113 can either be held manually in the FIG. 6 position, or by swinging the upper bead breaking unit 26 into a certain location, the shank 114 can be rested on a handle portion 115 of the unit 26 to maintain the FIG. 6 position.

The operator then depresses with his foot the treadle 119 (FIG. 1) of the air valve 86 so that air pressure is transmitted through the conduit 34 (FIG. 2) to the lower chamber 93, whereupon the piston 41 is forced upwardly axially of the standard 12. As the slider nut 44 moves upwardly in the guides 48 and 49, it engages the spiral member 28 and effects a rotation of the member 28 about a vertical axis, and which rotation is transmitted to the lower race 54 of the clutch bearing unit 29. By virtue of this rotation of the lower race 54, the ball bearings 57, which are in frictional engagement with the inner surface of the upper race wall 66, are moved down their floors 61 toward lower ends 63 thereof wherein they contact and become locked in engagement with the upper race outer wall 66.

Thus, the rotation of the spiral member 28 in one direction results in a rotation in the same direction of the table unit 13 by the operation of the clutch bearing unit 29. Referrnig again to FIG. 6, as the table unit 13 and the tire and wheel assembly 101 are rotated, for example, in a counterclockwise direction as viewed, the tool 113 becomes locked or clamped in the position indicated between the center post 14 and the shaft 24. Thus, as the table unit 13 continues to rotate, the bead 111 is forced up over the tool end 110 and out of engagement with the flange 112, the finger 117 acting to maintain an arcuate portion of the bead 111 disengaged from the flange 112 sufficient to ensure continued disengagement.

When the piston 41 (FIG. 2) has reached the sleeve 36 at the top of the cylinder housing 31, the operator removes his foot from the spring-returnable treadle 119 and the air pressure is then re-directed through the conduit 94 to the top side of the piston 41 so as to force the piston downwardly to its original position of FIG. 2. Although this downward movement rotates the spiral member 28 in an opposite direction due to the coaction therewith of the slider nut 44, such rotation is not transmitted to the table unit 13 due to the ball bearings 57 being forced toward the upper ends 62 of their pockets where they are retained out of engagement with the upper race 56. Thus, during the downward movement of the piston 41, the table unit 13 and the tire and wheel assembly 101 remain stationary. It is readily appreciated that should the entire bead 111 not be disengaged from the flange 112 by this operation, the operation can be repeated.

It should be mentioned here that as the piston 41 (FIG. 2) is moved upwardly, the exhaust pressurized air, in which the lubricant is entrained, is forced out through the conduit 94 to the air valve 86 and up through the exhaust conduit 99 to the interior of the standard 12 for lubricating purposes. Likewise, when the piston 41 is moving downwardly, the air is exhausted through the conduit 34 and directed again through the conduit 99. The operation having been described for the removing of the bead 111 from the wheel rim flange 112, it can readily be seen that by lifting the tire 102 upwardly until the lower bead 122 is against the flange 112, the demounting operation can be repeated until the lower bead is disengaged from the flange 112, whereupon the entire tire 102 is freed from the wheel 103.

To remount the tire 102 onto the wheel, the tire is placed with the lower bead 122 adjacent the upper flange 112. The tool 113 is reversed and positioned so that the shoe 118 is operatively engaged with the bead 122 and the flange. By operating the machine 10 as described hereinbefore, the lower bead 122 is guided back into engagement with the flange 112. The tire 102 is then lowered and the tool 113 is again positioned with the mounting shoe 118 in operative engagement with the upper bead 111 and the flange 112. Thus, upon actuating the air valve 86 by depressing the treadle 119, the table unit 13 and the tire and wheel assembly 101 are again rotated in a clockwise direction (FIG. 7), the tool 113 is locked between the center post 14 and the upstanding shaft 24 (see FIG. 6), and during rotation of the assembly 101, the bead 111 is guided over the shoe 118 and back onto the flange 112. Here again the operation can be repeated if necessary, it being remembered that the table unit 13 remains stationary when the piston 41 is moving downwardly to its bottomed position of FIG. 2.

In summary, this invention provides a simple but ruggedly built tire bead breaking machine wherein pneumatically operated structure mounted within the standard of the machine is easily operated to rotate the table supported tire and wheel assembly, the rotation being relative to both a dual-purpose mounting and demounting tool locked in place by structure provided therefor and to a dual-action bead breaking assembly.

I claim:

1. A machine for handling a tire and wheel assembly comprising, an upright tubular standard, a wheel support rotatably mounted on said standard, first means mounted within said standard for rotational movement, a one-way clutch means operatively connected to said wheel support and to said first means to rotate said wheel support in one direction in response to rotation of said first means in one direction, linearly movable second means reciprocally mounted within said standard, and means interconnected with said first means and said second means to rotate said first means in response to linear movement of said second means, whereby upon linear movement of said second means in one direction said first means is rotated in one direction to rotate said wheel support.

2. A machine for handling a tire and wheel assembly comprising, an upright tubular standard, a wheel support rotatably mounted on said standard, power means mounted within said standard and including a rotatable member, and a one-way clutch means mounted within said standard in operative connection with said member and said wheel support, said clutch means operable upon rotation of said member in one direction to engage and to rotate said wheel support in one direction, and on rotation of said member in an opposite direction, being released from engagement with said wheel support.

3. A machine for handling a tire and wheel assembly comprising, a normally upright tubular standard, a fluid operated piston and cylinder assembly mounted within said standard with the piston of said assembly reciprocally movable axially thereof, a spiral member mounted within said standard for rotation about the axis of said standard, said spiral member operatively associated with said piston whereby movement of said piston effects rotation of said spiral member, rotatable means mounted on said standard having a horizontally disposed table for supporting said tire and wheel assembly, and one way clutch means mounted within said rotatable means and operatively connected with said rotatable means and said spiral member, whereby upon movement of said piston in one direction said table is rotated in one direction, and upon movement of said piston in the opposite direction said table is stationary.

4. A machine for handling a tire and wheel assembly comprising, a normally upright tubular standard, a fluid operated piston and cylinder assembly mounted within said standard with the piston of said assembly being tubular and reciprocably movable axially of said standard, one end of said piston being exposed externally of said cylinder and having a slotted nut element secured thereto, a spiral member mounted within said standard for rotation about the axis of said standard, one end of said spiral member guidably mounted within said piston, said spiral member extended through said slotted nut element so as to be reversely rotatable upon reciprocal movement of said piston, table means rotatably mounted on said standard and including a tubular depending shaft providing an extension of said standard, and one way clutch bearing means mounted within said shaft and operatively connected between said tubular shaft and said spiral member for a driving connection therebetween upon movement of said piston in one direction, and for a non-driving connection therebetween upon movement of said piston in an opposite direction.

References Cited in the file of this patent

UNITED STATES PATENTS

| | | |
|---|---|---|
| 583,802 | Hartwig | June 1, 1897 |
| 756,368 | Hurdle | Apr. 5, 1904 |
| 1,072,701 | Collins | Sept. 9, 1913 |
| 1,498,299 | Rollins | June 17, 1924 |
| 1,824,246 | Van Daam | Sept. 22, 1931 |
| 1,900,852 | Duppersmith | Mar. 7, 1933 |
| 2,298,656 | Smith | Oct. 13, 1942 |
| 2,351,355 | Merrett | June 13, 1944 |
| 2,825,395 | Twiford | Mar. 4, 1958 |
| 2,968,185 | Jacobsen | Jan. 17, 1961 |

FOREIGN PATENTS

| | | |
|---|---|---|
| 161,851 | Australia | Mar. 10, 1955 |